US009274459B1

(12) United States Patent
Tokoro

(10) Patent No.: US 9,274,459 B1
(45) Date of Patent: Mar. 1, 2016

(54) IMAGE FORMING APPARATUS INCLUDING MEANDERING CORRECTION ROLLER

(71) Applicant: KYOCERA Document Solutions Inc., Osaka (JP)

(72) Inventor: Yoshitaka Tokoro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/836,151

(22) Filed: Aug. 26, 2015

(30) Foreign Application Priority Data

Aug. 29, 2014 (JP) ................................ 2014-174696

(51) Int. Cl.
*G03G 15/16* (2006.01)
*B65G 39/16* (2006.01)
*F16H 7/22* (2006.01)

(52) U.S. Cl.
CPC .................................. *G03G 15/1615* (2013.01)

(58) Field of Classification Search
CPC .................................................. G03G 15/1615
USPC ............................ 399/302; 474/123; 198/809
See application file for complete search history.

(56) References Cited

U.S. PATENT DOCUMENTS 5,181,888 A * 1/1993 Takahashi ............ G03G 15/755 474/101
2008/0219715 A1* 9/2008 Park ..................... G03G 15/161 399/302
2011/0052276 A1* 3/2011 Taoka .................. G03G 15/161 399/302
2011/0293336 A1 12/2011 Noso et al.
2012/0070201 A1* 3/2012 Shiobara ............ G03G 15/0131 399/302
2013/0192959 A1* 8/2013 Kitamura ............... B65H 5/021 198/806
2015/0227089 A1* 8/2015 Hozumi ............. G03G 15/1615 399/313
2015/0301484 A1* 10/2015 Hozumi ................. B65G 15/12 399/308

* cited by examiner

*Primary Examiner* — Billy Lactaoen
*Assistant Examiner* — Arlene Heredia Ocasio
(74) *Attorney, Agent, or Firm* — Wenderoth, Lind & Ponack, L.L.P.

(57) ABSTRACT

An image forming apparatus includes a rotation input section that is supported to one side roller axis so as to freely rotate integrally with an intermediate transfer belt in contact with the intermediate transfer belt when it has meandered to one side in an axial direction from a predetermined travel position, a rotation output section that is connected to the rotation input section via a speed reduction mechanism, a rotation gear section that is connected to the rotation output section, a fixed rack bar section that is engaged with the rotation gear section, and an urging member that urges the rotation gear section to return to an initial position when there is no rotation input, wherein an axis center of a meandering correction roller inclines in the state in which the rotation gear section so that the intermediate transfer belt meanders the one side in the axial direction.

3 Claims, 5 Drawing Sheets

IMAGE FORMING APPARATUS INCLUDING MEANDERING CORRECTION ROLLER

CROSS-REFERENCE TO RELATED APPLICATION

This application is based upon and claims the benefit of priority from Japanese Patent Application No. 2014-174696 filed on Aug. 29, 2014, the entire contents of which are incorporated herein by reference.

BACKGROUND

The technology of the present disclosure relates to an image forming apparatus.

Conventionally, there has been known an intermediate transfer type image forming apparatus using an endless intermediate transfer belt. The intermediate transfer belt is wound around a driving roller and a tension roller. In this type of image forming apparatus, for example, when the parallelism of the driving roller and the tension roller is poor, there is a case in which the intermediate transfer belt meanders. When the meandering amount becomes excessively large, there is a problem that image defects such as color shift occur.

In this regard, there has been proposed an image forming apparatus provided with a meandering prevention device capable of preventing excessive meandering of the intermediate transfer belt. The meandering prevention device has a meandering detection sensor that detects the meandering amount of the intermediate transfer belt, and an adjustment mechanism that adjusts the inclination of the tension roller with respect to a horizontal plane on the basis of a detection result by the meandering detection sensor. The adjustment mechanism has an eccentric cam and an arm member. The eccentric cam is rotationally driven by a motor. The arm member swings around a predetermined support shaft according to the rotation of the eccentric cam. Furthermore, one end of the tension roller ascends and descends by the swing operation of the arm member, resulting in a change in the inclination of the tension roller with respect to the horizontal plane.

SUMMARY

An image forming apparatus according to one aspect of the present disclosure includes an endless intermediate transfer belt that is wound around a plurality of rollers and travels.

Furthermore, at least one of the plurality of rollers is a meandering correction roller that corrects meandering of the intermediate transfer belt by changing inclination of an axis center of the meandering correction roller, and the meandering correction roller includes a roller body, one side roller axis, the other side roller axis, a fixed bearing, a rotation input section, a rotation output section, a rotation gear section, a fixed rack bar section, and an urging member. The one side roller axis protrudes from one side end surface of the roller body in an axial direction. The other side roller axis protrudes from the other side end surface of the roller body in the axial direction. The fixed bearing rotatably supports the other side roller axis while permitting the inclination of the axis center of the meandering correction roller. The rotation input section is supported to the one side roller axis so as to freely rotate. Furthermore, when the intermediate transfer belt has meandered to one side in the axial direction from a predetermined travel position, the rotation input section rotates together with the intermediate transfer belt in contact with the intermediate transfer belt. The rotation output section is supported to the one side roller axis so as to freely rotate. Furthermore, the rotation output section is connected to the rotation input section via a speed reduction mechanism and rotates in a direction opposite to a rotation direction of the rotation input section at a speed lower than a speed of the rotation input section. The rotation gear section is supported to the one side roller axis so as to freely rotate. Furthermore, the rotation gear section is integrally and rotatably connected to the rotation output section. The fixed rack bar section extends in a predetermined direction crossing a belt travel surface of the intermediate transfer belt, is engaged with the rotation gear section, and allows the rotation gear section to be movable in the predetermined direction. The urging member urges the rotation gear section to one side in the predetermined direction such that the rotation gear section returns to an initial position when there is no rotation input to the rotation input section. The inclination of the axis center of the meandering correction roller in the state in which the rotation gear section is in the initial position is inclination by which the intermediate transfer belt wound around the meandering correction roller meanders the one side in the axial direction.

DETAILED DESCRIPTION

Hereinafter, an embodiment of the present disclosure will be described in detail with reference to the drawings. It is noted that the technology of the present disclosure is not limited to the following embodiments.

Embodiment

Figure 1:
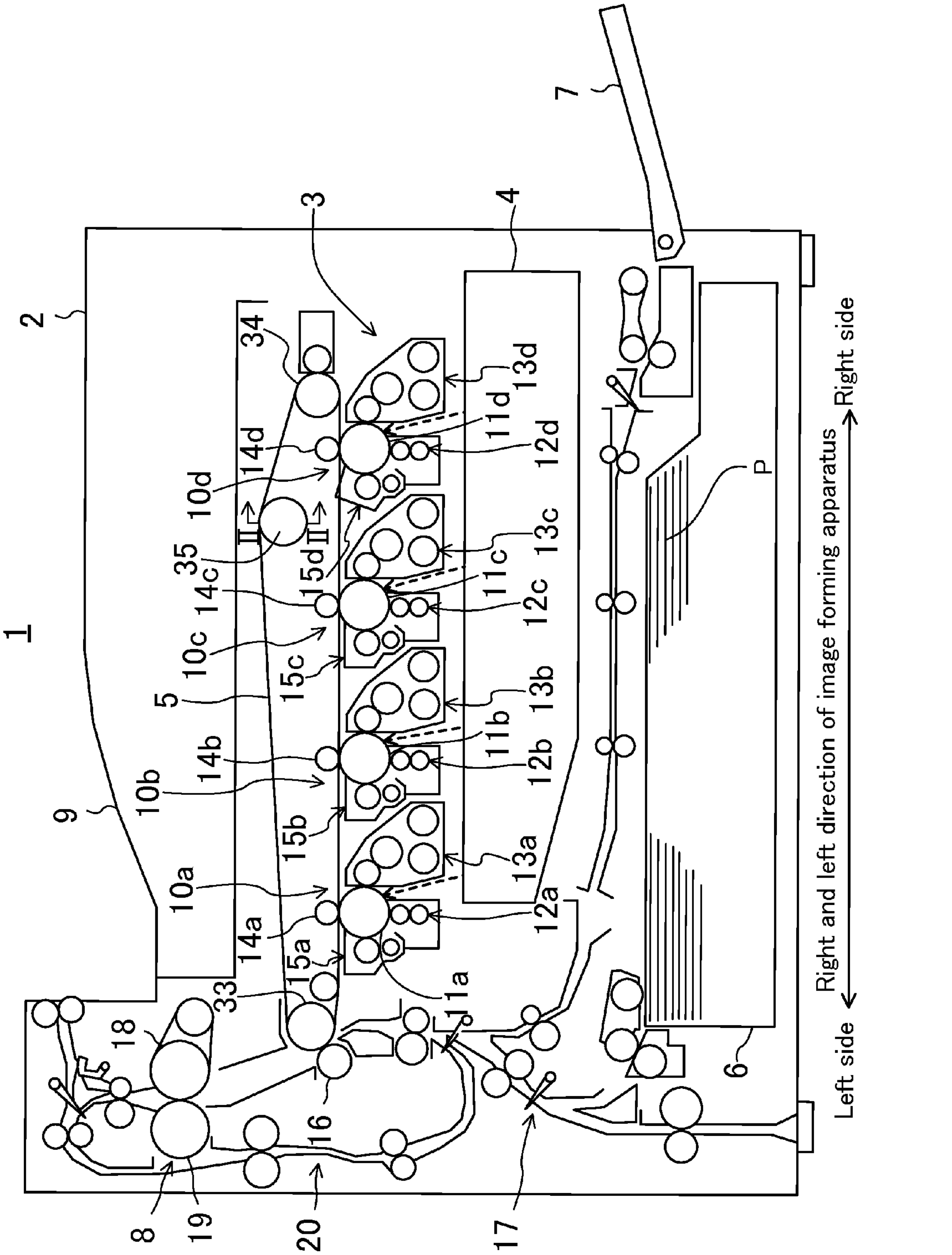
FIG. 1 is a schematic longitudinal sectional view illustrating an image forming apparatus in an embodiment of the present disclosure.

FIG. 1 is a schematic configuration diagram of an image forming apparatus 1 according to an embodiment of the present disclosure. The image forming apparatus 1 is a tandem type color printer and includes an image forming unit 3 in a box-like casing 2. The image forming unit 3 is an element that transfers and forms an image to a recording paper P on the basis of image data transmitted from an external device such as a network-connected computer. Below the image forming unit 3, an exposure device 4 is arranged to irradiate laser light, and above the image forming unit 3, an intermediate transfer device 30 having an intermediate transfer belt 5 is arranged. Under the exposure device 4, a paper storage unit 6 is arranged to store the recording paper P, and at a lateral side of the paper storage unit 6, a manual paper feeding unit 7 is arranged. Above the lateral side of the intermediate transfer belt 5, a fixing unit 8 is arranged to perform a fixing process on the image transferred and formed to the recording paper P. A reference numeral 9 indicates a paper discharge unit arranged at an upper portion of the casing 2 to discharge the recording paper P subjected to the fixing process in the fixing unit 8.

The image forming unit 3 includes four image forming units 10*a* to 10*d* arranged in a row along the intermediate transfer belt 5. The image forming unit 10*a* forms a black toner image, the image forming unit 10*b* forms a yellow toner image, the image forming unit 10*c* forms a magenta toner image, and the image forming unit 10*d* forms a cyan toner image. The image forming units 10*a* to 10*d* have photosensitive drums 11*a* to 11*d* as image carrying members, respectively. Directly under the photosensitive drums 11*a* to 11*d*, charging devices 12*a* to 12*d* are respectively arranged, and at one side of each of the photosensitive drums 11*a* to 11*d*, developing devices 13*a* to 13*d* are respectively arranged. Directly above the photosensitive drums 11*a* to 11*d*, primary transfer rollers 14*a* to 14*d* are respectively arranged, and at the other side of each photosensitive drum 11, cleaning units (hereinafter, referred to as cleaning devices) 15*a* to 15*d* are respectively arranged to clean the peripheral surface of the photosensitive drum 11.

The peripheral surface of each of the photosensitive drums 11*a* to 11*d* is uniformly electrified by the charging device 12, laser light corresponding to each color based on the image data input from the aforementioned computer and the like is irradiated from the exposure device 4 to the electrified peripheral surface of the photosensitive drum 11, so that an electrostatic latent image is formed on the peripheral surface of each of the photosensitive drums 11*a* to 11*d*. A developer is supplied to the electrostatic latent images from the developing device 13, so that toner images of black, yellow, magenta, and cyan are formed on the peripheral surfaces of the photosensitive drums 11*a* to 11*d*, respectively. These toner images are respectively superposed on and transferred to the intermediate transfer belt 5 by a transfer bias applied to the primary transfer roller 14.

A reference numeral 16 indicates a secondary transfer roller arranged below the fixing unit 8 in contact with the intermediate transfer belt 5, and the secondary transfer roller 16 is configured to interpose the recording paper P conveyed along a paper conveyance path 17 from the paper storage unit 6 or the manual paper feeding unit 7 between the secondary transfer roller 16 and the intermediate transfer belt 5, and to transfer the toner images on the intermediate transfer belt 5 to the recording paper P by a transfer bias applied to the secondary transfer roller 16.

The fixing unit 8 includes a heating roller 18 and a pressing roller 19, and is configured to heat and press the recording paper P while interposing the recording paper P between these heating roller 18 and pressing roller 19, thereby fixing the toner images, which have been transferred to the recording paper P, to the recording paper P. The recording paper P subjected to the fixing process is discharged to a paper discharge unit 9. A reference numeral 20 indicates a reversing conveyance path for reversing the recording paper P discharged from the fixing unit 8 at the time of duplex printing.

The aforementioned intermediate transfer belt 5 is wound around a driving roller 33, a tension roller 34, and an idle roller 35. The driving roller 33 and the tension roller 34 are arranged in approximately parallel with each other while being spaced apart from each other in the right and left direction of the image forming apparatus 1. The driving roller 33 is connected to a motor and allows the intermediate transfer belt 5 to travel in the clockwise direction of FIG. 1. The tension roller 34 is urged to the right side of FIG. 1 by a spring (not illustrated) and applies tension to the intermediate transfer belt 5. The idle roller 35 is arranged above the driving roller 33 and the tension roller 34 to define a travel path of the intermediate transfer belt 5.

Figure 2:
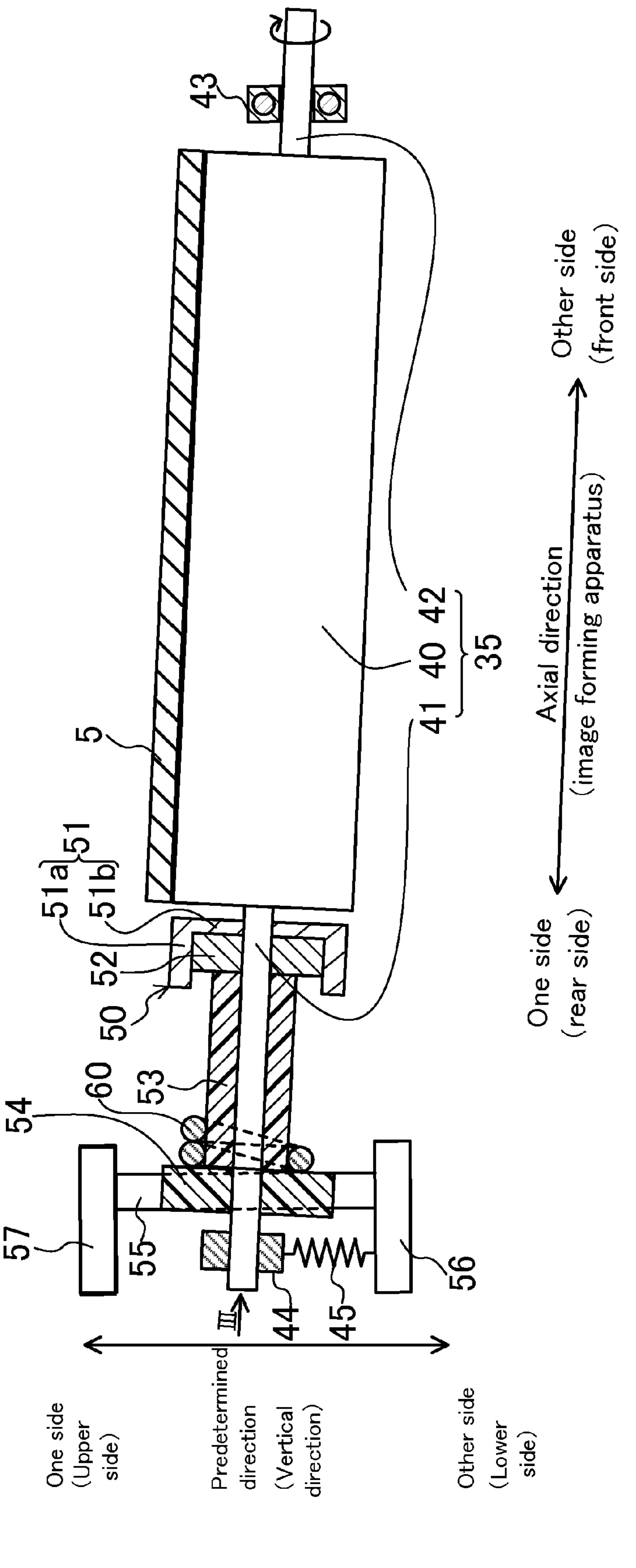
FIG. 2 is a sectional view taken along line II-II of FIG. 1, which illustrates a meandering correction mechanism of an intermediate transfer belt.

In an embodiment of the present disclosure, the idle roller 35 serves as a meandering correction roller that corrects the meandering of the intermediate transfer belt 5 by changing the inclination (inclination for a horizontal plane in the embodiment of the present disclosure) of an axis center thereof. In detail, as illustrated in FIG. 2, the idle roller has a cylindrical roller body 40 around which the intermediate transfer belt 5 is wound, one side roller axis 41 protruding from one side end surface of the roller body 40 in an axial direction, and the other side roller axis 42 protruding from the other side end surface of the roller body 40 in the axial direction. Axis centers of the roller body 40 and both roller axes 41 and 42 coincide with each other. Both ends of the aforementioned idle roller 35 are supported by a fixed bearing 43 and a movable bearing 44. The fixed bearing 43 supports the other side roller axis 42 so as to freely rotate and is fixed to a front wall of the casing 2. The movable bearing 44 supports the one side roller axis 41 so as to freely rotate. The movable bearing 44 is elastically supported to a lower horizontal frame 56 having a plate shape via a compressive coil spring 45. Accordingly, the movable bearing 44 is configured to be displaceable in the vertical direction. Preferably, the movable bearing 44 is guided to be slidably by a guide member (not illustrated) in the vertical direction.

As described above, of the two bearing 43 and 44 that support the idle roller 35, one is set as the fixed bearing 43 and the other is set as the movable bearing 44, so that the idle roller 35 is tiltable by employing the fixed bearing 43 as a fulcrum. The aforementioned fixed bearing 43 is configured by a deep groove ball bearing in the embodiment of the present disclosure. The fixed bearing 43 is configured to be able to permit the inclination of the axis center of the idle roller 35. The fixed bearing 43, for example, may also be configured by a self-aligning ball bearing. In this way, since it is possible to more reliably absorb the inclination of the axis center of the idle roller 35 by the fixed bearing 43, it is preferable. The aforementioned movable bearing 44 is configured by a sliding bearing in the embodiment of the present disclosure; however, the technology of the present disclosure is not limited thereto. For example, the movable bearing 44 may also be configured by a rolling bearing such as a deep groove ball bearing.

At an end portion of the aforementioned one side roller axis 41 adjacent to the roller body 40 side, a rotation input section 51 and a rotation output section 52 are supported so as to freely rotate.

The rotation input section 51, for example, is formed in a cylindrical cup shape. That is, the rotation input section 51 has a cylindrical part 51*a* and a disk part 51*b* that closes the roller body 40 side of the cylindrical part 51*a* in the axial direction. The one side roller axis 41 passes through the center portion of the disk part 51*b*. The rotation input section 51 is configured such that an outer peripheral surface of the rotation input section 51 and an inner peripheral surface of the intermediate transfer belt 5 make contact with each other when the intermediate transfer belt 5 has meandered to one side in the axial direction from a predetermined travel position by a predetermined amount or more. Preferably, an outer diameter of the rotation input section 51 (the cylindrical part 51*a*) is slightly larger than that of the roller body 40. In this way, when the intermediate transfer belt 5 has meandered to the one side in the axial direction, it is possible to reliably allow the inner peripheral surface of the intermediate transfer belt 5 and the outer peripheral surface of the rotation input section 51 to make contact with each other.

The aforementioned rotation output section 52 is arranged at a radial inside of the cylindrical part 51*a* of the rotation input section 51. Between the rotation input section 51 and the rotation output section 52, a speed reduction mechanism is interposed. The speed reduction mechanism decelerates the rotation of the rotation input section 51 at a predetermined reduction ratio, rotates the rotation input section 51 in an opposite direction, and transmits the rotation of the rotation input section 51 to the rotation output section 52. Accordingly, the rotation output section 52 rotates in a direction opposite to that of the rotation input section 51 at a speed lower than that of the rotation input section 51. The aforementioned speed reduction mechanism, for example, includes a harmonic drive (a registered trademark) mechanism. Since it is possible to obtain a high reduction ratio by using the harmonic drive (a registered trademark), it is preferable.

At an end portion of the aforementioned one side roller axis 41 at the movable bearing 44 side, a rotation gear section 54 is supported to freely rotate. The rotation gear section 54 is integrally and rotatably connected to the rotation output section 52 via a cylindrical connection member 53. The connection member 53 is supported to the one side roller axis 41 so as to freely rotate. A twist spring 60 to be described later is fitted to an end portion of the connection member 53 at the rotation gear section 54 side. The twist spring 60 has a coil shape obtained by winding a wire two times to three times for example. An inner diameter of the twist spring 60 is larger than an outer diameter of the connection member 53. The twist spring 60 has one end portion connected to a peripheral edge portion of an end surface of the rotation gear section 54 and the other end portion fixed to the casing 2. Accordingly, the twist spring 60 urges the rotation gear section 54 to one side in the circumferential direction thereof.

Figure 3:
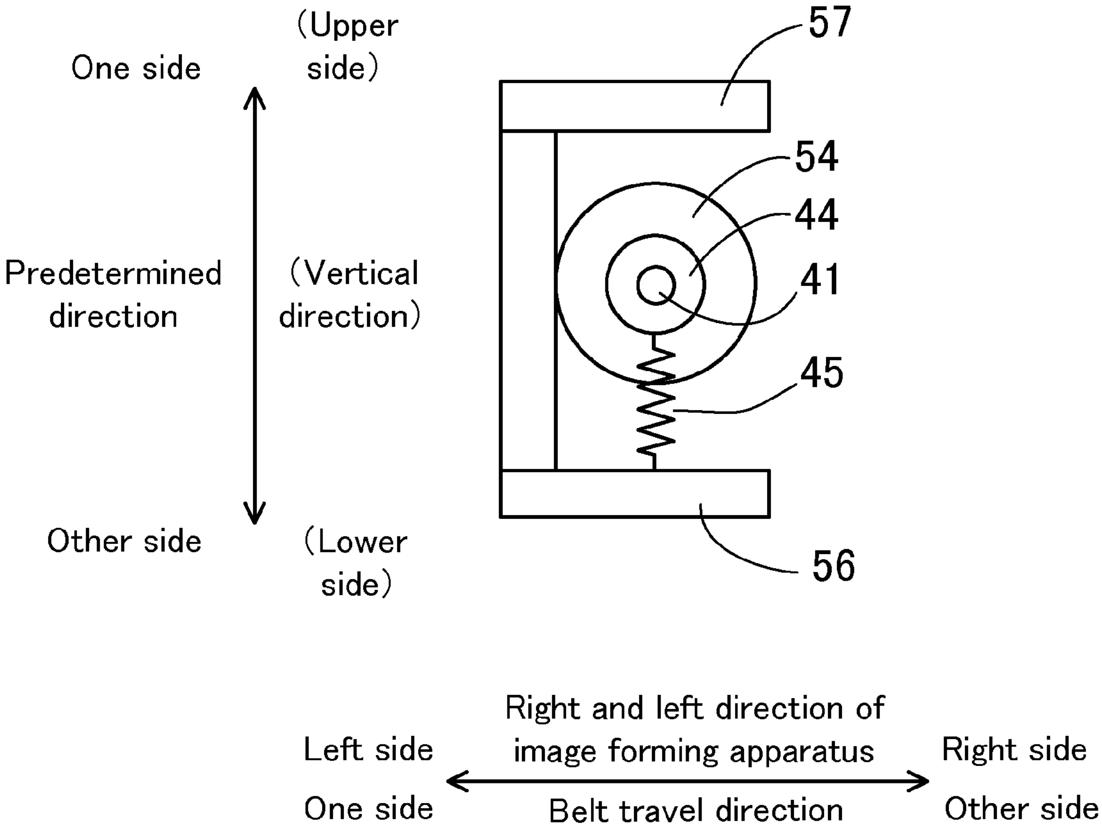
FIG. 3 is a view viewed in the arrow direction of III of FIG. 2.

The rotation gear section 54 is engaged with a fixed rack bar section 55 extending in the vertical direction (a direction crossing a belt travel surface) (see FIG. 3). The fixed rack bar section 55 is formed with a plurality of tooth parts at one side surface of a plate-shaped member that is extending in the vertical direction, in a thickness direction. A lower end portion of the fixed rack bar section 55 is fixed to a lower horizontal frame 56 and an upper end portion thereof is fixed to an upper horizontal frame 57. Both frames 56 and 57 are commonly fixed to a rear sidewall of the casing 2. The fixed rack bar section 55 is engaged with the rotation gear section 54 to convert a rotary motion of the rotation gear section 54 into a straight-line motion in the vertical direction.

The rotation gear section 54 is urged to the one side in the circumferential direction by the aforementioned twist spring 60 and thus is urged upward along the aforementioned fixed rack bar section 55. The twist spring 60 (corresponding to an urging member) has a function of returning the rotation gear section 54 to an initial position when there is no rotation input to the rotation input section 51 (that is, when the intermediate transfer belt 5 does not make contact with the rotation input section 51).

In the state in which the aforementioned rotation gear section 54 is in the initial position (the state of FIG. 2), the idle roller 35 (the meandering correction roller) is inclined such that the other side end portion in the axial direction thereof is higher than one side end portion.

Figure 4:
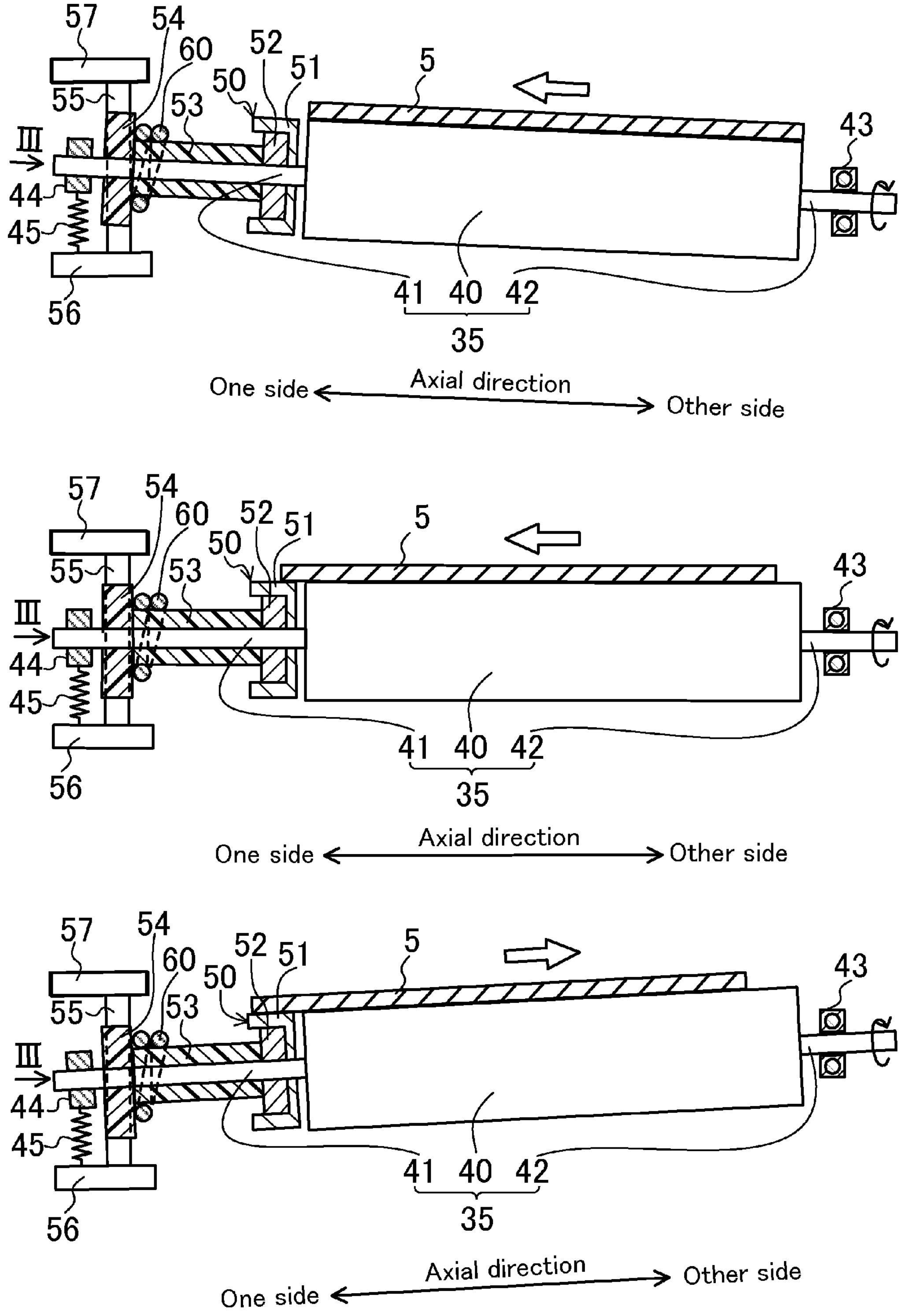
FIG. 4 is an explanation diagram for explaining an operation of a meandering correction device.

In this state, when the intermediate transfer belt 5 starts to travel, the intermediate transfer belt 5 starts to meander to the one side in the axial direction so as to be wound around the aforementioned inclined idle roller 35 (see the upper stage diagram of FIG. 4). When a meandering amount of the intermediate transfer belt 5 from a predetermined travel position (for example, a position at which an axial center position of the intermediate transfer belt 5 and an axial center position of the idle roller 35 coincide with each other) is equal to or more than a predetermined amount, the inner peripheral surface of the intermediate transfer belt 5 makes contact with the outer peripheral surface of the rotation input section 51. As a consequence, the rotation input section 51 starts to rotate together with the intermediate transfer belt 5. The rotation of the rotation input section 51 is transferred to the rotation output section via the speed reduction mechanism. The rotation output section 52 rotates in a direction opposite to that of the rotation input section 51 at a speed lower than that of the rotation input section 51, so that the rotation gear section 54 rotates together with the rotation output section 52. The rotation gear section 54 rotates while being engaged with the fixed rack bar section 55, thereby moving downward (to the other side in a predetermined direction) along the fixed rack bar section 55. As a consequence, the one side roller axis 41 is displaced downward (to the other side in the predetermined direction) together with the rotation gear section 54. On the other hand, the other side roller axis 42 is not displaced because it has been supported and fixed to the fixed bearing 43. Therefore, the one side end portion of the roller body 40 starts to descend and then the roller body 40 becomes level (see the intermediate stage diagram of FIG. 4). In this state, the intermediate transfer belt 5 continuously moves to the one side in the axial direction by inertia force. Thereafter, when the one side end portion of the roller body 40 is lower than the other side end portion thereof (see the lower stage diagram of FIG. 4), the intermediate transfer belt 5 starts to meander in a direction opposite to the previous direction (from the one side to the other side in the aforementioned axial direction). After the lapse of a certain time, the inner peripheral surface of the intermediate transfer belt 5 does not make contact with the rotation input section 51, that is, there is no rotation input to the rotation input section 51. As a consequence, the rotation gear section 54 returns to the initial position by the urging force of the twist spring 60. The intermediate transfer belt 5 repeats a series of these operations, thereby traveling while slightly meandering in the axial direction of the roller body 40. Consequently, even though the intermediate transfer belt 5 slightly meanders, there is no excessive meandering. Thus, it is possible to prevent image defects such as color shift caused by excessive meandering of the intermediate transfer belt 5.

In the aforementioned embodiment, when there has been no rotation input to the rotation input section 51, the rotation gear section 54 is configured to return to the initial position by using the urging force of the twist spring 60, so that it is possible to reliably return the rotation gear section 54 to the initial position as compared with the case of using only the urging force of the compressive coil spring 45.

Other Embodiments

The technology of the present disclosure may also have the following configurations with respect to the aforementioned embodiment.

Figure 5:
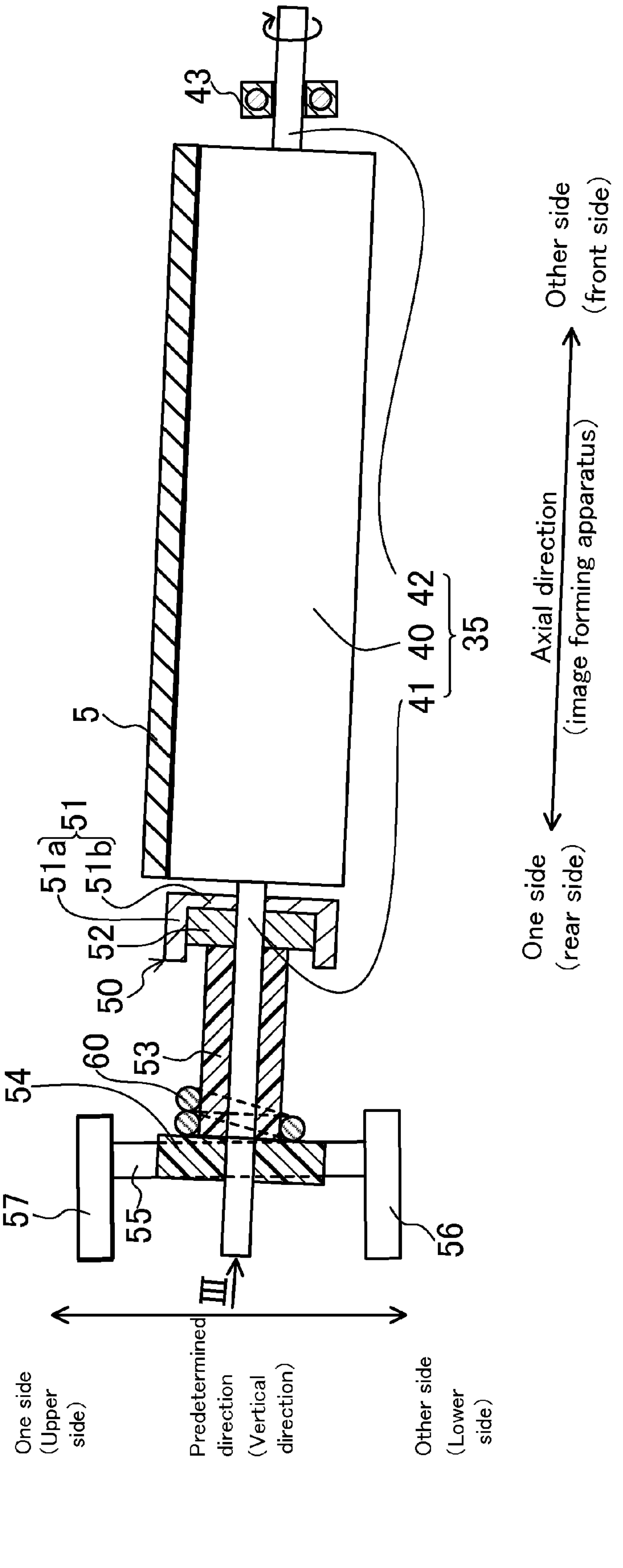
FIG. 5 is a view corresponding to FIG. 2, which illustrates another embodiment of the present disclosure.

That is, in the aforementioned embodiment, the one side roller axis 41 is configured to be supported by the movable bearing 44; however, the technology of the present disclosure is not limited thereto. For example, it may be possible to employ a one-side support structure in which the movable bearing 44 is removed and the idle roller 35 is supported only by the fixed bearing 43 as illustrated in FIG. 5. In this way, it is possible to remove the compressive coil spring 45 in addition to the movable bearing 44, so that it is possible to reduce the entire cost of the apparatus.

In the aforementioned embodiment, the rotation gear section 54 is configured to be urged upward by the twist spring 60 along the fixed rack bar section 55. However, the twist spring 60 may also be removed and the rotation gear section 54 may also be indirectly urged only by the urging force of the compressive coil spring 45.

In the aforementioned embodiment, among the plurality of rollers 33 to 35 around which the intermediate transfer belt 5 is wound, the idle roller 35 is used as the meandering correction roller; however, the technology of the present disclosure is not limited thereto. For example, the tension roller 34 or the idle roller 35 may also be used as the meandering correction roller. Furthermore, all the rollers 33 to 35 may also be used as the meandering correction roller.

What is claimed is:

1. An image forming apparatus including an endless intermediate transfer belt wound around a plurality of rollers to travel, wherein at least one of the plurality of rollers is a meandering correction roller that corrects meandering of the intermediate transfer belt by changing inclination of an axis center of the meandering correction roller, and the meandering correction roller has a roller body, one side roller axis protruding from one side end surface in an axial direction of the roller body, and the other side roller axis protruding from the other side end surface in the axial direction of the roller body, and comprises:

a fixed bearing that rotatably supports the other side roller axis while permitting the inclination of the axis center of the meandering correction roller;

a rotation input section that is supported to the one side roller axis so as to freely rotate and rotates together with the intermediate transfer belt in contact with the intermediate transfer belt when the intermediate transfer belt has meandered to one side in the axial direction from a predetermined travel position;

a rotation output section that is supported to the one side roller axis so as to freely rotate, is connected to the rotation input section via a speed reduction mechanism, and rotates in a direction opposite to a rotation direction of the rotation input section at a speed lower than a speed of the rotation input section;

a rotation gear section that is supported to the one side roller axis so as to freely rotate and is integrally and rotatably connected to the rotation output section;

a fixed rack bar section that extends in a predetermined direction crossing a belt travel surface of the intermediate transfer belt, is engaged with the rotation gear section, and allows the rotation gear section to be movable in the predetermined direction; and an urging member that urges the rotation gear section to one side in the predetermined direction such that the rotation gear section returns to an initial position when there is no rotation input to the rotation input section, wherein the inclination of the axis center of the meandering correction roller in a state in which the rotation gear section is in the initial position is inclination by which the intermediate transfer belt wound around the meandering correction roller meanders the one side in the axial direction.

2. The image forming apparatus of claim 1, wherein the urging member includes a twist spring that urges the rotation gear section to one side in a circumferential direction around an axis center of the rotation gear section, thereby urging the rotation gear section to the one side in the predetermined direction along the fixed rack bar section.

3. The image forming apparatus of claim 1, the image forming apparatus comprises:

a movable bearing configured to be movable in the predetermined direction and rotatably supporting the one side roller axis, wherein the urging member includes a coil spring that urges the movable bearing to the one side in the predetermined direction, thereby indirectly urging the rotation gear section to the one side in the predetermined direction along the fixed rack bar section.

* * * * *